(12) United States Patent
Limont et al.

(10) Patent No.: US 9,014,673 B2
(45) Date of Patent: *Apr. 21, 2015

(54) ENFORCING DEVICE SETTINGS FOR MOBILE DEVICES

(71) Applicant: Microsoft Corporation, Redmond, WA (US)

(72) Inventors: David P. Limont, Seattle, WA (US);
John Allen Atwood, Duvall, WA (US);
Massimiliano Ciccotosto, Kirkland, WA (US); Omar Aftab, Redmond, WA (US);
Patrick Tousignant, Bellevue, WA (US);
Selvaraj Nalliah, Redmond, WA (US);
Zhidong Yang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,924

(22) Filed: Nov. 26, 2013

(65) Prior Publication Data
US 2014/0089475 A1 Mar. 27, 2014

Related U.S. Application Data

(63) Continuation of application No. 13/081,726, filed on Apr. 7, 2011, now Pat. No. 8,626,128, which is a continuation of application No. 11/171,850, filed on Jun. 30, 2005, now Pat. No. 8,010,997.

(51) Int. Cl.
*H04M 1/725* (2006.01)
*H04L 29/06* (2006.01)
(Continued)

(52) U.S. Cl.
CPC ............ *H04L 63/10* (2013.01); *H04L 41/0813* (2013.01); *H04L 41/0869* (2013.01); *H04W 8/245* (2013.01); *H04M 1/72561* (2013.01); *H04L 41/28* (2013.01)

(58) Field of Classification Search
CPC ....................................................... H04W 28/14

USPC ........ 455/410, 411, 412.1, 412.2, 413, 414.1, 455/414.2, 414.3; 726/1, 2, 3, 4, 5, 6; 709/217, 218, 219, 220, 221, 222
See application file for complete search history.

(56) References Cited

U.S. PATENT DOCUMENTS 5,390,216 A 2/1995 Bilitza et al.
(Continued)

FOREIGN PATENT DOCUMENTS

JP 2000-155710 6/2000
(Continued)

OTHER PUBLICATIONS

Box, Donald F., et al "Adaptive—An Object-Oriented Framework for Flexible and Adaptive Communication Protocols" IFIP Conference Online, Dec. 1992, URL: Http://www.cs.wustl.edu/schmidt/PDF/HPN-93.pdf.

(Continued)

*Primary Examiner* — Christopher M Brandt
(74) *Attorney, Agent, or Firm* — Louise Bowman; Jim Ross; Micky Minhas

(57) ABSTRACT

The present invention extends to methods, systems, and computer program products for enforcing device settings for mobile devices. Generally, a computer system enforces appropriate mobile device settings (e.g., policy and/or configuration settings) prior to permitting a mobile device to access maintained data. The computer system receives a request from a mobile device. The computer system determines that current mobile device settings are not appropriate for accessing the maintained data. The computer system sends device settings, representing a new mobile device configuration that is appropriate accessing the maintained data, to the mobile device. The computer system receives an indication that the mobile device is configured in accordance with the device settings. The computer system permits the mobile device to access the maintained data in response to receiving the indication that the mobile device is configured in accordance with the device settings.

20 Claims, 5 Drawing Sheets

(51) Int. Cl.
*G06F 17/30* (2006.01)
*G06F 15/16* (2006.01)
*H04L 12/24* (2006.01)
*H04W 8/24* (2009.01)

(56) References Cited

U.S. PATENT DOCUMENTS

| | | | |
|---|---|---|---|
| 5,450,573 A | | 9/1995 | Gronemeyer |
| 6,134,283 A | | 10/2000 | Sands et al. |
| 6,256,304 B1 | | 7/2001 | Vayrynen |
| 6,285,680 B1 | | 9/2001 | Steinka et al. |
| 6,295,541 B1 | * | 9/2001 | Bodnar et al. ............... 1/1 |
| 6,308,223 B1 | | 10/2001 | Opgenoorth |
| 6,577,878 B1 | | 6/2003 | Park et al. |
| 6,711,151 B1 | | 3/2004 | Ziegler |
| 6,810,114 B2 | * | 10/2004 | Welfley .................. 379/88.18 |
| 6,922,723 B1 | | 7/2005 | Sharp et al. |
| 7,024,214 B2 | | 4/2006 | Loveland |
| 7,024,491 B1 | | 4/2006 | Hanmann et al. |
| 7,093,286 B1 | * | 8/2006 | King ............................ 726/12 |
| 7,277,726 B2 | * | 10/2007 | Ahya et al. .................. 455/557 |
| 7,281,263 B1 | * | 10/2007 | LaMastres et al. ............ 726/2 |
| 7,493,130 B2 | | 2/2009 | Loveland |
| 7,526,297 B1 | * | 4/2009 | Holur et al. .................. 455/466 |
| 7,676,573 B2 | | 3/2010 | Herzog et al. |
| 7,676,830 B2 | * | 3/2010 | Kuz et al. ......................... 726/5 |
| 7,689,713 B2 | | 3/2010 | Fornari |
| 7,693,516 B2 | * | 4/2010 | Hundal et al. ............. 455/435.1 |
| 7,729,696 B2 | * | 6/2010 | Harris et al. .............. 455/432.3 |
| 7,734,737 B2 | | 6/2010 | Mittal et al. |
| 7,734,745 B2 | | 6/2010 | Gloe |
| 8,005,469 B2 | * | 8/2011 | Adams et al. ................ 455/418 |
| 8,010,997 B2 | | 8/2011 | Limont et al. |
| 8,069,219 B2 | * | 11/2011 | Wikman et al. ............... 709/217 |
| 8,626,128 B2 | | 1/2014 | Limont et al. |
| 2001/0048728 A1 | | 12/2001 | Peng |
| 2001/0054115 A1 | | 12/2001 | Ferguson et al. |
| 2002/0013827 A1 | * | 1/2002 | Edstrom et al. ............... 709/219 |
| 2002/0068552 A1 | | 6/2002 | Siemens |
| 2002/0197984 A1 | | 12/2002 | Monin et al. |
| 2003/0036398 A1 | | 2/2003 | Asakawa |
| 2003/0046434 A1 | | 3/2003 | Flanagin et al. |
| 2003/0055994 A1 | * | 3/2003 | Herrmann et al. ........... 709/229 |
| 2003/0119524 A1 | | 6/2003 | Carlsson |
| 2003/0125057 A1 | | 7/2003 | Pesola |
| 2003/0126236 A1 | | 7/2003 | Marl et al. |
| 2003/0126327 A1 | | 7/2003 | Pesola et al. |
| 2003/0126464 A1 | | 7/2003 | McDaniel et al. |
| 2003/0177389 A1 | * | 9/2003 | Albert et al. .................. 713/201 |
| 2004/0121764 A1 | * | 6/2004 | Rivero ........................... 455/418 |
| 2004/0123150 A1 | | 6/2004 | Wright et al. |
| 2004/0123153 A1 | | 6/2004 | Wright et al. |
| 2004/0132428 A1 | * | 7/2004 | Mulligan .................... 455/411 |
| 2004/0193907 A1 | * | 9/2004 | Patanella ..................... 713/200 |
| 2004/0225731 A1 | * | 11/2004 | Piispanen et al. ............ 709/224 |
| 2005/0101310 A1 | * | 5/2005 | Shachak ..................... 455/418 |
| 2005/0124315 A1 | * | 6/2005 | Kageyama et al. ........... 455/403 |
| 2005/0239481 A1 | | 10/2005 | Seligmann |
| 2005/0243778 A1 | | 11/2005 | Wang et al. |
| 2006/0069743 A1 | | 3/2006 | Oommen |
| 2006/0112427 A1 | | 5/2006 | Shahbazi |
| 2007/0006289 A1 | | 1/2007 | Limont et al. |
| 2007/0082657 A1 | * | 4/2007 | Kim ........................... 455/412.2 |
| 2007/0101405 A1 | * | 5/2007 | Engle et al. ...................... 726/4 |
| 2007/0162760 A1 | | 7/2007 | Samuelsson et al. |
| 2008/0066164 A1 | * | 3/2008 | Chebolu et al. .................. 726/4 |
| 2008/0083010 A1 | | 4/2008 | Koehler et al. |
| 2008/0137593 A1 | | 6/2008 | Laudermilch et al. |
| 2008/0189363 A1 | | 8/2008 | Tian |
| 2009/0124247 A1 | | 5/2009 | Knowles |
| 2009/0144434 A1 | | 6/2009 | Tian et al. |
| 2009/0271845 A1 | | 10/2009 | Zhao et al. |
| 2010/0115582 A1 | | 5/2010 | Sapp et al. |
| 2010/0228836 A1 | | 9/2010 | Lehtovirta et al. |
| 2010/0281143 A1 | | 11/2010 | Krahn et al. |
| 2011/0086611 A1 | | 4/2011 | Klein et al. |

FOREIGN PATENT DOCUMENTS

| | | | | |
|---|---|---|---|---|
| JP | 2001-202319 | | 7/2001 | |
| JP | 2001-274841 | | 10/2001 | |
| JP | 2002-055864 | | 2/2002 | |
| WO | 02/096139 | | 11/2002 | |
| WO | WO 2004/021114 A2 | * | 3/2004 | ........... H04L 9/00 |

OTHER PUBLICATIONS

Kuroda, Masahiro, et al. "A Study of Autonomous Data Coherency Protocol for Mobile Divices" Computer Communication and Networks, 1999. Proceedings Eight International Conference, Boston, MA Oct. 11-13, 1999.
U.S. Non-Final Office Action mailed Aug. 25, 2004, in U.S. Appl. No. 10/082,918.
Response to U.S. Non-Final Office Action mailed Aug. 25, 2004, in U.S. Appl. No. 10/082,918, filed Nov. 22, 2004.
U.S. Non-Final Office Action mailed Jun. 17, 2005, in U.S. Appl. No. 10/082,918.
Response to U.S. Non-Final Office Action mailed Jun. 17, 2005, in U.S. Appl. No. 10/082,918, filed Sep. 2, 2005.
Notice of Allowance mailed Nov. 15, 2005, in U.S. Appl. No. 10/082,918.
U.S. Non-Final Office Action mailed Mar. 4, 2008, in U.S. Appl. No. 11/340,346.
Response to Non-Final Office Action mailed Mar. 4, 2008, in U.S. Appl. No. 11/340,346, filed Jun. 4, 2008.
Notice of Allowance mailed Nov. 6, 2008, in U.S. Appl. No. 11/340,346.
European Communication mailed Sep. 13, 2005 in Application No. 03 003 290.8.
European Application 03003290.8, Preparation for Oral Argument mailed Jan. 27, 2009 (2 pages).
European Application 03003290.8, Summons to Attend Oral Proceedings mailed Feb. 3, 2009 (8 pages).
European Application 03003290.8, Written Submission in Preparation to/during Oral Proceedings filed Apr. 28, 2009 (40 pages).
European Application 03003290.8, Result of Consultation by Telephone/In Person mailed May 29, 2009 (23 pages).
European Application 03003290.8, Decision to Grant a European Patent mailed Oct. 22, 2009 (2 pages).
Response to European Communication mailed Sep. 13, 2005 in Application No. 03 003 290.8, filed Mar. 22, 2006.
European Search Report dated Feb. 2, 2005 in Application No. 03 003 290.8.
Japanese Notice of Rejection mailed Jan. 15, 2010 in Japanese Patent Application No. 2009-149011.
Response to Japanese Notice of Rejection mailed Jan. 15, 2010 in Japanese Patent Application No. 2009-149011, filed Apr. 13, 2010.
Japanese Notice of Allowance mailed May 28, 2010 in Japanese Patent Application No. 2009-149011.
Japanese Official Notice of Rejection mailed Oct. 31, 2008, in Japanese Patent Application No. 2003-022799.
Response to Japanese Official Notice of Rejection mailed Oct. 31, 2008, in Japanese Patent Application No. 2003-022799, filed Jan. 30, 2009.
Japanese Official Notice of Rejection mailed Mar. 24, 2009 in Japanese Patent Application No. 2003-022799.
Response to Japanese Official Notice of Rejection mailed Mar. 24, 2009 in Japanese Patent Application No. 2003-022799, filed Jun. 23, 2009.
Japanese Notice of Allowance mailed Aug. 14, 2009 in Japanese Patent Application No. 2003-022799.
Hummel, S.F. "Efficient Data Sharing with Conditional Remote Memory Transfers," Computer Architecture News, vol. 24, No. 5, 1996, pp. 9-17.
U.S. Appl. No. 11/171,850, Non-Final Office Action mailed Mar. 25, 2009.

(56) References Cited

OTHER PUBLICATIONS

U.S. Appl. No. 11/171,850, Amendment and Response dated Jul. 24, 2009.
U.S. Appl. No. 11/171,850, Final Office Action mailed Nov. 6, 2009.
U.S. Appl. No. 11/171,850, Amendment and Response dated Jan. 27, 2010.
U.S. Appl. No. 11/171,850, Non-Final Office Action mailed Apr. 12, 2010.
U.S. Appl. No. 11/171,850, Amendment and Response dated Jun. 28, 2010.
U.S. Appl. No. 11/171,850, Notice of Allowance mailed Sep. 20, 2010.
U.S. Appl. No. 11/171,850, Notice of Allowance mailed Jan. 19, 2011.
U.S. Appl. No. 11/171,850 Notice of Allowance mailed May 12, 2011.
U.S. Appl. No. 13/081,726, Non-fmal Rejection mailed Dec. 13, 2012, 23 pages.
U.S. Appl. No. 13/081,726, Amendment and Response dated Mar. 13, 2013, 11 pages.
U.S. Appl. No. 13/081,726, Notice of Allowance mailed Apr. 30, 2013, 22 pages.
U.S. Appl. No. 13/081,726, Notice of Allowance mailed Aug. 29, 2013, 25 pages.
U.S. Appl. No. 13/081,726, Amendment under 37 C.F.R. § 1.312 dated Nov. 26, 2013, 3 pages.

* cited by examiner

ENFORCING DEVICE SETTINGS FOR MOBILE DEVICES

CROSS-REFERENCE TO RELATED APPLICATIONS

This application is a continuation of and claims benefit to U.S. Pat. No. 8,626,128, entitled "ENFORCING DEVICE SETTINGS FOR MOBILE DEVICES," filed Apr. 7, 2011, which application is a continuation of U.S. Pat. No. 8,010, 997, filed Jun. 30, 2005, all of which are hereby incorporated herein by reference in their entirety.

BACKGROUND OF THE INVENTION

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Computer systems and other electronic devices can have a variety of different configurations including, personal computers, laptop computers, hand-held devices, multi-processor systems, microprocessor-based or programmable consumer electronics, network PCs, minicomputers, mainframe computers, mobile telephones, PDAs, pagers, and the like. Many of these different types of computer systems and electronic devices can be configured to communicate wirelessly, such as, for example, in accordance with the I.E.E.E. 802.11 standards, General Packet Radio Service ("GPRS"), Global System for Mobile Communications ("GSM"), etc. Generally, wireless communication is beneficial since it allows a computer system or other electronic device maintain network connective when moved between different physical locations. For example, a mobile device, such as, for example, a mobile telephone or PDA, may be able to maintain connectivity to a GPRS network, when moved across town, between different cities, and even between different countries. Beneficially, the mobile devices can typically access data (e.g., electronic mail messages, Web based content, etc.) across wide geographical ranges.

Accessing data typically requires that a requesting computer system have access to an address (e.g., Internet Protocol ("IP") address) of the computer system (e.g., server) that maintains the data. For example, a computer system requesting access to a Web page can be required to have access to a Uniform Resource Location ("URL") used to located the Web page. When more sensitive data is made available through wired and/or wireless networks, security mechanisms are routinely used to protect the data from unauthorized access. For example, accessing electronic mail messages from an e-mail server can require a user to have an account with an e-mail server. To authenticate with the e-mail server, a computer system can transfer a user entered user-id and password to the electronic mail server.

Computer systems operating in a wired networking environment are to some extent inherently more secure than computer systems operating in a wireless networking environment. For example, alternate physical locations where a wired computer system can achieve network connectively can be limited. That is, to access data, a wired computer system may be required to be in a physical location that has a network tap in communication with a server that maintains the data. Further, there is a reduced risk of a wired computer system being lost. For example, it is extremely unlikely for a user to lose a desktop computer system that has a wired connection to a corporate Local Area Network ("LAN"). There is also a reduced risk of a wired computer system being stolen since many wired computer systems are maintained in physical locations that are not publicly accessible (e.g., inside corporate buildings, homes, etc).

Further, in a wired networking environment, other security mechanisms can be used to prevent unauthorized data access. These other security mechanisms can limit data access based on the physical location, domain, and/or electronic address of a computer system. For example, an administrator could limit access to sensitive research data to only those computer systems contained in a research facilitates that generates the research data. Thus, even if a wired computer system is stolen, it may be difficult, if not impossible, to gain unauthorized access to data from the wired network the wired computer system was previously connected to.

Further, in a wired networking environment, an administrator often has direct physical control over computer systems that are connected to the network (e.g., the wired computer systems are within a corporate building). Accordingly, the administrator can select and maintain the applications that are installed on the computer systems. In some environments, an administrator may chose to "lock down" the configuration of computer systems to insure that the configuration of the computer systems remains appropriately secure for accessing data. When server side or network upgrades occur, the administrator can "unlock" the computer systems to install appropriate client side updates and can then again lock down the computer systems. However, this manual re-configuration of computer systems can be time consuming.

As a result, administrators often configure wired computer systems to receive policy updates without administrator intervention. From time to time, a server can "push" policy updates to wired computer systems to insure that wired computer systems adhere to specified security policies. In some environments, wired computer systems are divided into groups (or domains) that are administered as a unit with common rules and procedures (e.g., all computer systems in the corporate headquarters or all computer systems used by IT employees). Policies can be varied across different domains such that an administrator can vary the policies that are pushed to different wired computer systems.

Policy updates can be used to force a wired computer system to use a specified version of a protocol, to use a specified version of encryption algorithm, to use a specified key length, to prevent installation of custom applications, etc. A wired computer system's failure to implement these policies can prevent the wired computer system from accessing data (even if an appropriate user-id and password are submitted). Since an administrator often has more control over wired computer systems, the administrator can insure that wired computer systems include the appropriate resources (e.g., memory, software, etc.) for receiving and implementing policy updates.

Thus, it is possible to increase the security of private data by limiting data access to controlled wired computer systems.

However, limiting data access to controlled wired computer systems is not always feasible. Computer system users typically desire available and flexible access to their data regardless of location and/or the type of computer system that will be used to access the data. For example, sales personnel and executives may frequently be out of the office on business travel and while traveling may need access to corporate data, such as, for example, e-mail and sales figures.

As result, many applications allow at least some general external (e.g., Web based) access to data. External access applications can be utilized by wired and wireless computer systems to access private and/or sensitive data. For example, a sales person executive may use a mobile device to connect to a corporate LAN through an external GPRS service provider (e.g., a mobile phone company) to access e-mail.

Unfortunately, allowing general external access to data puts the data at increased risk for unauthorized access, for example, from hackers or other malicious users. Even for authorized users, there is may be no way to control the security polices of computer systems that attempt general external access to data.

Wireless access can be particularly problematic, since computer systems operating in a wireless networking environment, such as, for example, mobile devices, are to some extent inherently less secure than computer systems operating in a wired networking environment. One difficulty is that a wireless device can typically achieve network connectivity from an extensive number of alternate physical locations. For example, a mobile telephone may have network connectively across a wide geographic area, such as, across an entire country or even access the entire Earth. Since wireless computer systems can be and often are moved between different physical locations, many of which are public, there is an increased risk of wireless computer systems being lost or stolen. For convenience, many mobile devices are of reduced size, further increasing the risk of loss or theft. For example, it is much more likely for a mobile phone to be lost or stolen than it is for a desktop computer system to be lost or stolen. Thus, there is an increased risk of a malicious user obtaining a computer system that was previously used to access data wirelessly.

Unfortunately, many security mechanisms used to prevent unauthorized in a wired networking environment are unavailable and/or are not feasible in wireless networking environment. For example, it may be unmanageable for an administrator to lock down the configuration of every mobile device (mobile phone, PDS, etc.) that utilizes external data access. It is difficult to place wireless computer systems, in domains since the access locations and access mechanisms may vary based on physical location. For example, access settings in Boston may be different than access setting in San Francisco.

Further, there is often no way for an administrator to determine what policy settings are implemented and/or supported by a wireless computer system. For example, a mobile device may support a standard protocol, such as, for example, Hyper-Text Transfer Protocol ("HTTP"), but has no way to communicate policy settings (if they even exist) using the standard protocol. Some mobile devices may simply lack the resources (e.g., system memory, applications, etc.) to implement policy settings. Further, even if a mobile device does support various policy settings, there is typically no way for an administrator to remotely alter policy settings or enforce compliance with policy settings. Thus, an administrator may be forced to make a choice between preventing all external wireless access to data or opening up data to increased security risks associated with external wireless access.

BRIEF SUMMARY OF THE INVENTION

The foregoing problems with the prior state of the art are overcome by the principles of the present invention, which are directed towards methods, systems, and computer program products for enforcing device settings for mobile devices. Generally, a computer system (e.g., an electronic mail server) enforces an appropriate mobile device configuration prior to permitting a mobile device to access maintained data. The computer system receives a request from a mobile device. The request requests that the mobile device be permitted to access data maintained by the computer system, the request indicating a current mobile device configuration of the mobile device.

The computer system determines that current mobile device configuration is not appropriate for accessing the maintained data. The computer system sends device configuration settings to the mobile device. The device configuration settings representing a new mobile device configuration that is appropriate accessing the maintained data. The computer system receives an indication that the mobile device is configured in accordance with the device configuration settings. The computer system permits the mobile device to access the maintained data in response to receiving the indication that the mobile device is configured in accordance with the device configuration settings.

In some embodiments, a computer system enforces mobile device access policies prior to permitting mobile device access to maintained data. The computer system receives a data command from a mobile device. The data command indicates a policy version representing the current policy settings at the mobile device. The computer system determines that the current policy settings at the mobile device are not appropriate for accessing data maintained by the computer system.

The computer system notifies the mobile device that the current policy settings are not appropriate for accessing the maintained data. The computer system receives a policy request from the mobile device. The policy request requests policy settings that are appropriate for accessing the maintained data. The computer system identifies updated policy settings that are appropriate for accessing the maintained data. The computer system sends the updated policy settings along with a corresponding updated policy version to the mobile device, the updated policy version representing the updated policy settings.

The computer system receives a data request along with the updated policy version from the mobile device. The data request requests that the mobile device be permitted to access the maintained data. The updated policy version indicates that the mobile device is configured in accordance with the updated policy settings. The computer system notifies the mobile device that access to the maintained data has been permitted.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
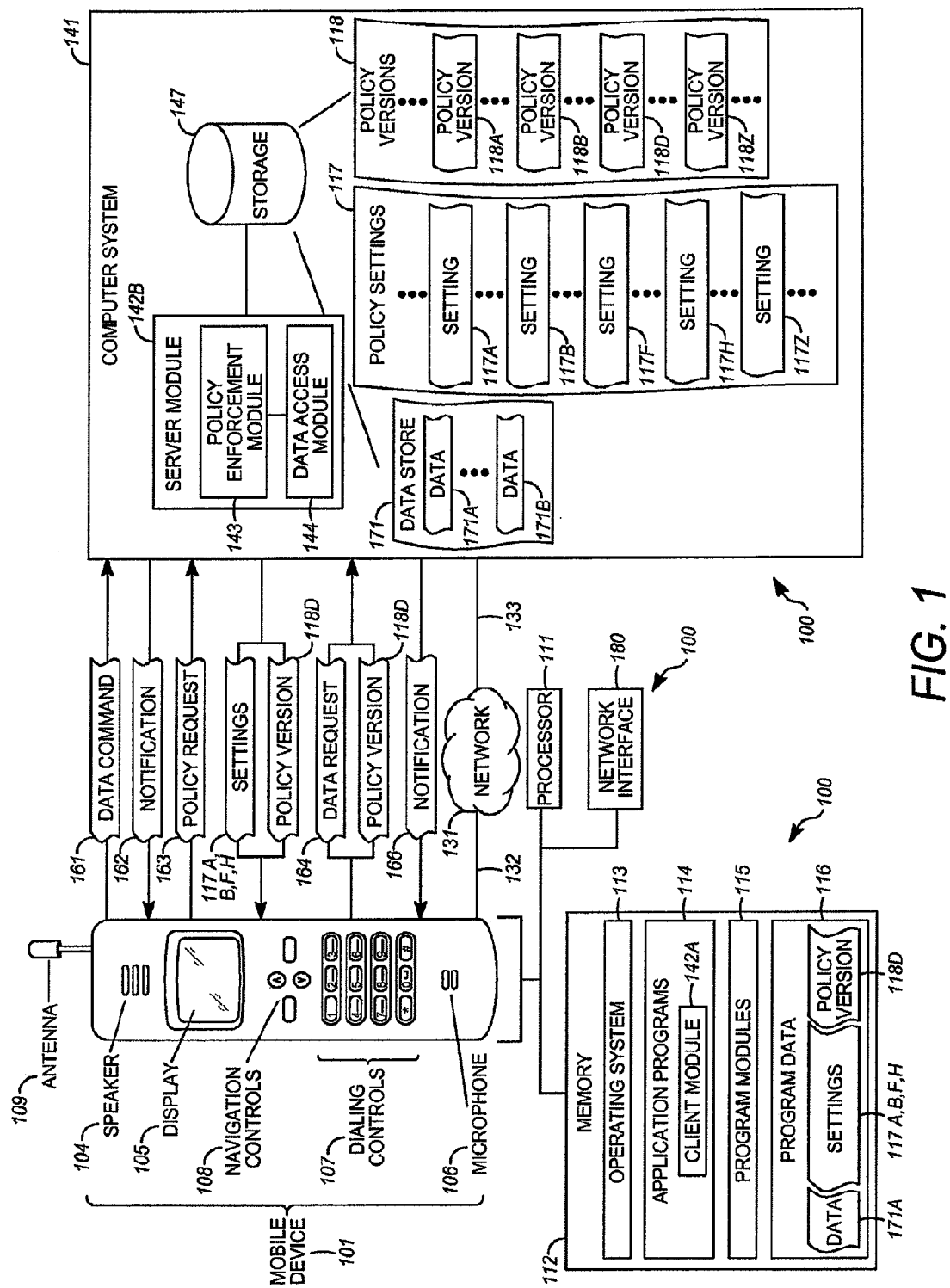
FIG. 1 illustrates an example of a computer architecture that facilitates enforcing policy settings for mobile devices.

The principles of the present invention provide for enforcing device settings for mobile devices. Generally, a computer system (e.g., an electronic mail server) enforces an appropriate mobile device configuration prior to permitting a mobile device to access maintained data. The computer system receives a request from a mobile device. The request requests that the mobile device be permitted to access data maintained by the computer system, the request indicating a current mobile device configuration of the mobile device.

The computer system determines that current mobile device configuration is not appropriate for accessing the maintained data. The computer system sends device configuration settings to the mobile device. The device configuration settings representing a new mobile device configuration that is appropriate accessing the maintained data. The computer system receives an indication that the mobile device is configured in accordance with the device configuration settings. The computer system permits the mobile device to access the maintained data in response to receiving the indication that the mobile device is configured in accordance with the device configuration settings.

In some embodiments, a computer system enforces mobile device access policies prior to permitting mobile device access to maintained data. The computer system receives a data command from a mobile device. The data command indicates a policy version representing the current policy settings at the mobile device. The computer system determines that the current policy settings at the mobile device are not appropriate for accessing data maintained by the computer system The computer system notifies the mobile device that the current policy settings are not appropriate for accessing the maintained data. The computer system receives a policy request from the mobile device. The policy request requests policy settings that are appropriate for accessing the maintained data. The computer system identifies updated policy settings that are appropriate for accessing the maintained data. The computer system sends the updated policy settings along with a corresponding updated policy version to the mobile device, the updated policy version representing the updated policy settings.

The computer system receives a data request along with the updated policy version from the mobile device. The data request requests that the mobile device be permitted to access the maintained data. The updated policy version indicates that the mobile device is configured in accordance with the updated policy settings. The computer system notifies the mobile device that access to the maintained data has been permitted.

Embodiments within the scope of the present invention include computer-readable media for carrying or having computer-executable instructions or data structures stored thereon. Computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Computer-executable instructions comprise, for example, instructions and data which cause a general-purpose computer system or special-purpose computer system to perform a certain function or group of functions. Computer executable instructions may be, for example, binaries, intermediate format instructions such as assembly language, or even source code.

In this description and in the following claims, a "network" is defined as one or more data links that enable the transport of electronic data between computer systems and/or modules. Local Area Networks ("LANs"), Wide Area Networks ("WANs") and the Internet are examples of networks.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "mobile device" is defined as a subset of computer systems that primarily (or solely) access networked data using wireless mechanisms and are easily transportable by a human (e.g., can be carried in a user's pocket) between different physical locations. Mobile devices may have limited resources (e.g., processor, data storage, system memory, protocols, applications, user-interface functionality, etc.) as compared to other computer systems. Mobile phones, watches, and PDA's are examples of mobile devices.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates enforcing policy settings of mobile devices. Depicted in computer architecture 100 is mobile device 101 and computer system 141. Mobile device 101 is connected to network 131, such as, for example, a Local Area Network ("LAN"), a Wide Area Network ("WAN"), or even the Internet, via communication link 132. Similarly, computer system 141 connected to network 131 via communication link 133. Thus, mobile device 101, computer system 141, and other network connected computer systems (not shown) can exchange data via network 131. Accordingly, mobile device 101 and computer system 141, as well as other connected computer systems, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 131.

With reference to FIG. 1, a suitable operating environment for the principles of the invention includes a general-purpose computer system in the form of a mobile device 101. Mobile device 101 includes a speaker 104 for presenting audio information (e.g., spoken words) to the user, a display 105 for presenting visual information to the user, a microphone 106 for inputting audio information (e.g., spoken words) into mobile device 101, dialing controls 107 represented by 12 buttons through which a user may enter information (e.g., generate DTMF tones), and navigation control buttons 108 that assist the user in navigating through various entries and options listed on display 105. Although not required, mobile device 101 may also have an antenna 109. Audio-based user-interface 123 collectively represents speaker 104, dialing controls 107, and microphone 106.

Although mobile device 101 has the appearance of a mobile telephone, the unseen features of the telephonic device may allow for complex and flexible general-purpose processing capabilities. For example, the mobile device 101 also includes processor 111, network interface 180, and memory 112 that are connected to each other and to speaker 104, display 105, navigation controls 108, dialing controls 107, microphone 106, and antenna 109 when appropriate, via system bus 110. The memory 112 generally represents a wide variety of volatile and/or non-volatile memories and may include types of memory previously discussed. However, the particular type of memory used in the mobile device 101 is not important to the present invention. Program code means comprising one or more program modules may be stored in memory 112. The one or more program modules may include an operating system 113, one or more application programs 114, program modules 115, and program data 116.

Mobile device 101 is connectable to networks, such as, for example, an office-wide or enterprise-wide computer network, an intranet, and/or the Internet. Mobile device 101 can wirelessly exchange data with external sources, such as, for example, remote computer systems and/or application databases over such a network. Mobile device 101 includes network interface 180 that can, when appropriate, with antenna 109 to interoperate receive data from external sources and/or transmit data to external sources. For example, mobile device 101 can transmit DTMF tones and exchange other audio based data with external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Communication link 132 logically represents that mobile device 101 is connected to network 131. Communication link 132 abstracts the actually physical representation of the connection from mobile device 101 to network 131. The actual physical representation can include communication through one or more intermediate network devices and can include communication in one or more different protocols. At least a portion of the actual physical representation can include wireless communication using wireless protocols (e.g., GPRS, GSM, etc. to a mobile telephone server provider)

Generally, mobile device 101 can store data, such as, for example, electronic mail messages, Web pages, documents, policy settings, policy versions, configuration settings, configuration versions, etc. in memory 112. Mobile device 101 can utilize client side programs, such as, for example, client module 142A (e.g., an electronic mail client) to access data from a server (e.g., an electronic mail server).

Computer system 141 includes server module 142B (e.g., an electronic mail server) and storage 147. Server module 142B further includes policy enforcement module 143 and data access module 144. Generally, storage 147 can store data, such as, for example, electronic mail messages, Web pages, documents, policy settings, policy versions, configuration settings, configuration versions, etc. For example, storage 147 can store policy settings 117 representing a group of policy settings that mobile devices can implement. As depicted, policy settings 117 include setting 117A, setting 117B, setting 117F, setting 117H, and setting 117Z. A series of two dots (a vertical ellipsis) between, before and after the expressly depicted policy settings represents that other policy settings can be included between, before and after the expressly depicted policy settings.

Policy settings can be name/value pairs. The name represents the name of a policy setting and the value represents the value of the policy setting. Policy setting values can be of virtually any data type, such as, for example, Boolean, integer, floating point, string, character, enumerated, etc.

Policy settings can include: a Personal Identification Number ("PIN") lock activation setting, a minimum PIN length setting, a PIN format setting (e.g., alphanumeric or numeric), a number of PIN failures permitted before performing a local wipe setting, a number of PIN failures after which an override "passcode" must be entered setting, a force wipe on next connection to server setting, a client application version setting, a protocol version setting, a protocol commands allowed setting, a custom application permitted setting, a time interval for enforcing compliance setting, a remote wipe enabled setting, and a require policy check setting.

Generally, if a PIN lock setting is activate (or TRUE), a user of a mobile device must enter a PIN through an input interface (e.g., dialing controls) to unlock the mobile device. If a specified number of incorrect PIN entries are detected, the mobile device can initiate a local wipe of memory contents.

Remote (or server initiated) wipe settings can include: a user agent string setting providing a human readable indication the involved mobile device (e.g., Trey-T5600/1.2), a DeviceID setting uniquely identifying a mobile device and resolve ambiguity between devices using the same user agent string, a pending remote wipe setting indicating if a mobile device has been designated for a storage wipe, remote wipe timestamp setting indicating a wipe action and when the wipe action occurred.

A require policy check setting indicates if policy compliance is required to submit various protocol commands, such as, for example, Sync, Folder Sync, GetHierarchy, etc.

An exception list policy setting can be utilized to exempt a user from one or more other policy settings.

It should be understood that embodiments of the present invention are not limited to the expressly described policy settings. It would be apparent to one skilled in the art, after having reviewed this description, that embodiments of the present in invention can utilize other policy settings, in addition to those expressly described.

Also as depicted, policy versions 118 include policy version 118A, policy version 118B, policy version 118D, and policy version 118Z. A series of two dots (a vertical ellipsis) between, before and after the expressly depicted policy versions represents that other policy versions can be included between, before and after the expressly depicted policy versions. A policy version is a reduced set of data, such as, for example, a policy identifier, that represents a group of one or more policy settings. For example, policy version 118D can be used to represent the settings 117A, B, F, and H. Thus, an indication that a mobile device adheres to policy version 118DA, implies that the mobile device implements settings 17A, B, F, and H.

As depicted, data store 171 includes data 171A and 171B. Different data portions can represent different types of data. For example data 171A can be electronic mail messages and data 171B can be Web pages. Alternately, different data portions can represent similar or the same type of data but for different users. For example data 171A can be electronic mail messages for user A and data 171B can be electronic mail messages for a different user B.

Server module 142B can interoperate with client side programs (e.g., client module 142A) to transfer data (e.g., electric mail messages) to a mobile device. Thus, in response to a mobile device data request, policy enforcement module 143 can determine if a requesting mobile device's policy settings are appropriate for accessing data. Policy enforcement module 143 can interoperate with authentication and/or authorization modules of server module 142B (not shown) to reduce the likelihood of inappropriate data access. When policy settings are appropriate (and, for example, a user is authenticated and authorized), data access module 144 accesses requested data and transfers requested data to the requesting mobile device. On the other hand, when policy settings are inappropriate (and even if a user is authenticated and authorized), policy enforcement module 143 can access appropriate policy settings and transfer the appropriate policy settings to the requesting mobile device.

Communication link 133 logically represents that computer system 141 is connected to network 131. Communication link 133 abstracts the actually physical representation of the connection from computer system 141 to network 131. The actual physical representation can include communication through one or more intermediate network devices and can include communication in one or more different protocols. At least a portion of the actual physical representation can include wireless communication using wireless protocols.

Figure 2:
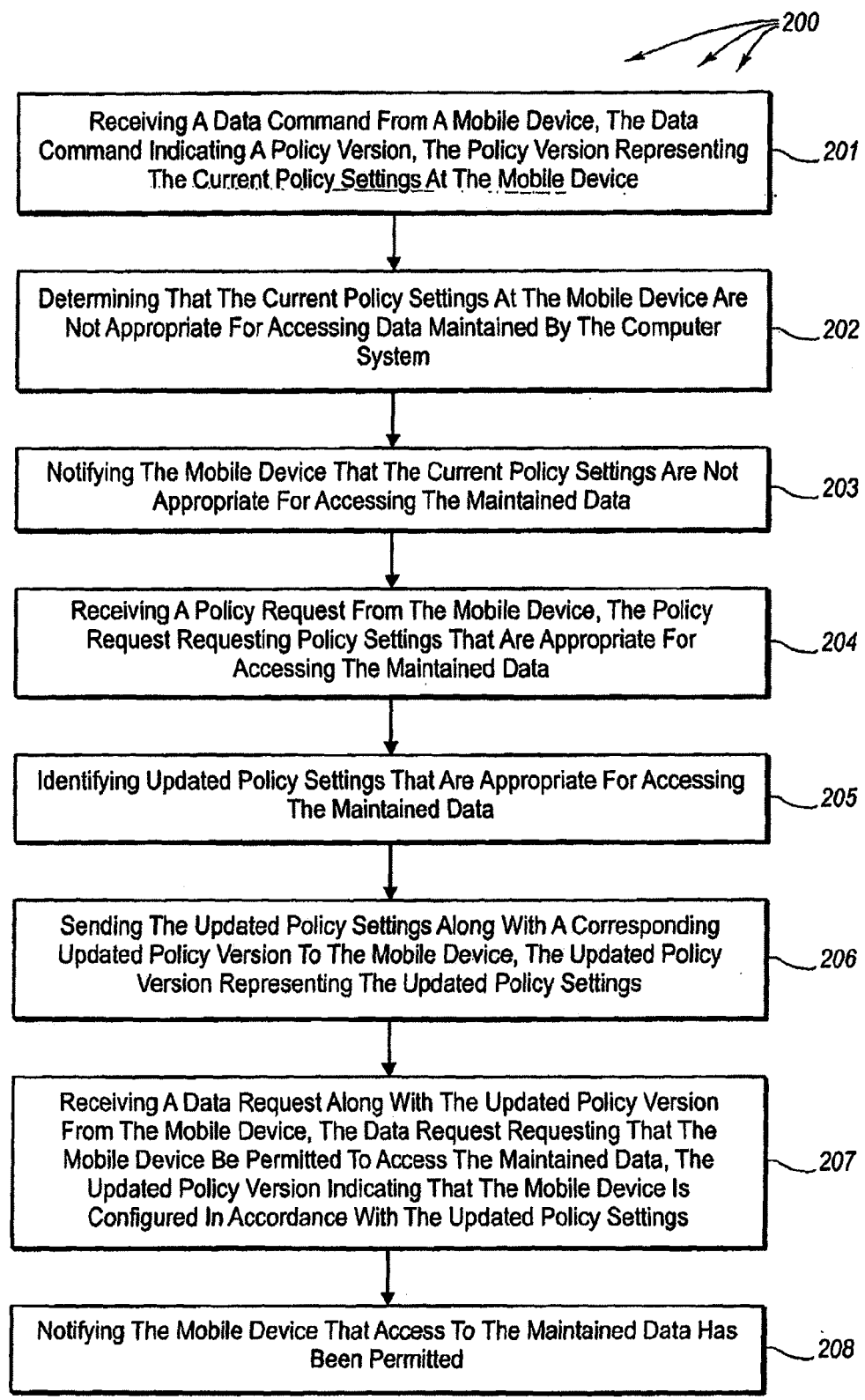
FIG. 2 illustrates an example flow chart of a method for enforcing mobile device access policies prior to permitting mobile device access to maintained data.

FIG. 2 illustrates an example flow chart of a method 200 for enforcing mobile device access policies prior to permitting mobile device access to maintained data. Method 200 will be described with respect to the components and data depicted in computer architecture 100.

Method 200 includes an act of receiving a data command from a mobile device, the data command indicating a policy version, the policy version representing the current policy settings at the mobile device (act 201). For example, mobile device 101 (client module 142A) can send data command 161 to computer system 141. Computer system 141 can receive data command 161 from mobile device 101. Data command 161 can be a request for data, such as, for example, a sync or folder sync command. Alternately, data command 161 can be provision command expressly requesting appropriate policy settings.

A data command may or may not expressly include a policy version. Lack of an expressly included policy version can indicate that a mobile device has yet to implement and/or does not support policies.

Method 200 includes an act of determining that the current policy settings at the mobile device are not appropriate for accessing data maintained by the computer system (act 202). For example, policy enforcement module 143 can compare a policy version included in data command 161 to other policy versions (e.g., included in policy versions 118) that are appropriate for accessing data (e.g., electronic mail messages and folders in data store 171) maintained by server module 142B (e.g., an electronic mail server). When the included policy version does not match any other appropriate policy version, policy enforcement module 143 determines that the policy settings of mobile device 101 are inappropriate for accessing data maintained by server module 142B. If no policy version was included, policy enforcement module 143 can be default determine that the policy settings of mobile device 101 are inappropriate for accessing data maintained by server module 142B.

Method 200 includes an act notifying the mobile device that the current policy settings are not appropriate for accessing the maintained data (act 203). For example, server module 142B can send notification 162 to mobile device 101 to notify mobile device 101 that its current policy settings are inappropriate for access data maintained by server module 142B.

Data command 161 (a request) and notification 162 (a response) can be corresponding messages in a request/response protocol, such as, for example, HTTP. In some embodiments, notification 162 is configured to include an HTTP 5xx (e.g., 512) response code indicating that the server could not fulfill the request (i.e., data command 161).

Method 200 includes an act of receiving a policy request from the mobile device, the policy request requesting policy settings that are appropriate for accessing the maintained data (act 204). For example, mobile device 101 (client module 142A) can send policy request 163 to computer system 141. Computer system 141 can receive policy request 163 from mobile device 101. Policy request 163 can be an initial request for policy settings, can be a request sent in response expiration of a time interval, can be a request sent in response to a notification of new policy settings, or can be a request sent after a period of exception for a user has expired.

Method 200 includes an act of identifying updated policy settings that are appropriate for accessing the maintained data (act 205). For example, policy enforcement module 143 can identify that settings 117A, B, F, and H are appropriate for accessing data maintained by server module 142B. Settings 117A, B, F, and H can correspond to any of the previously described policy settings.

Method 200 includes an act of sending the updated policy settings along with a corresponding updated policy version to the mobile device, the updated policy version representing the updated policy settings (act 206). For example, server module 142B can send settings 117A, B, F, and H along with policy version 118D to mobile device 101. Policy request 163 (a request) and settings 117A, B, F, and H along with policy version 118D (a response) can be corresponding messages in a request/response protocol, such as, for example, HTTP.

Mobile device 101 can implement settings 117A, B, F, and H (potentially altering current policy settings) to comply with policy settings that are appropriate for accessing data maintained by server module 142B. For example, mobile device 101 can implement a PIN enforcement policy in accordance with settings 117A, B, F, and H. Mobile device 101 can store settings 117A, B, F, and H and policy version 118D in program data 116 for subsequent access.

Method 200 includes an act of receiving a data request along with the updated policy version from the mobile device, the data request requesting that the mobile device be permitted to access the maintained data, the updated policy version indicating that the mobile device is configured in accordance with the updated policy settings (act 207). For example, mobile device 101 (client module 142A) can send data request 164 along with policy version 118D to computer system 141. Computer system 141 can receive data request 164 along with policy version 118D from mobile device 101. Data request 164 can be a request to access data 171A.

Policy enforcement module 143 can determine, for example, through comparison to known appropriate policy versions, that policy version 118D represents policy settings that are appropriate for accessing data 171.

Method 200 includes an act of notifying the mobile device that access to the maintained data has been permitted (act 208). For example, server module 142B can send notification 166 to mobile device 101. Notification 166 can indicate to mobile device 101 that policy enforcement module 143 has permitted access to data 171A. Data request 164 along with policy version 118D (a request) and notification 166 (a response) can be corresponding messages in a request/response protocol, such as, for example, HTTP.

If other access requirements are satisfied (e.g., authentication and authorization), mobile device 101 can subsequently access data 171A. Mobile device 101 can then store data 171A for subsequent use by client module 142A, such as, for example, displaying electronic mail messages and/or folders at display 105.

Accordingly, embodiments of the present invention can be used to reduce the likelihood of a compromised device or a device with non-compliant policy settings being able to access data. For example, the use of periodic enforcement and storage wiping can significantly limit the ability of malicious user to access data.

Figure 3:
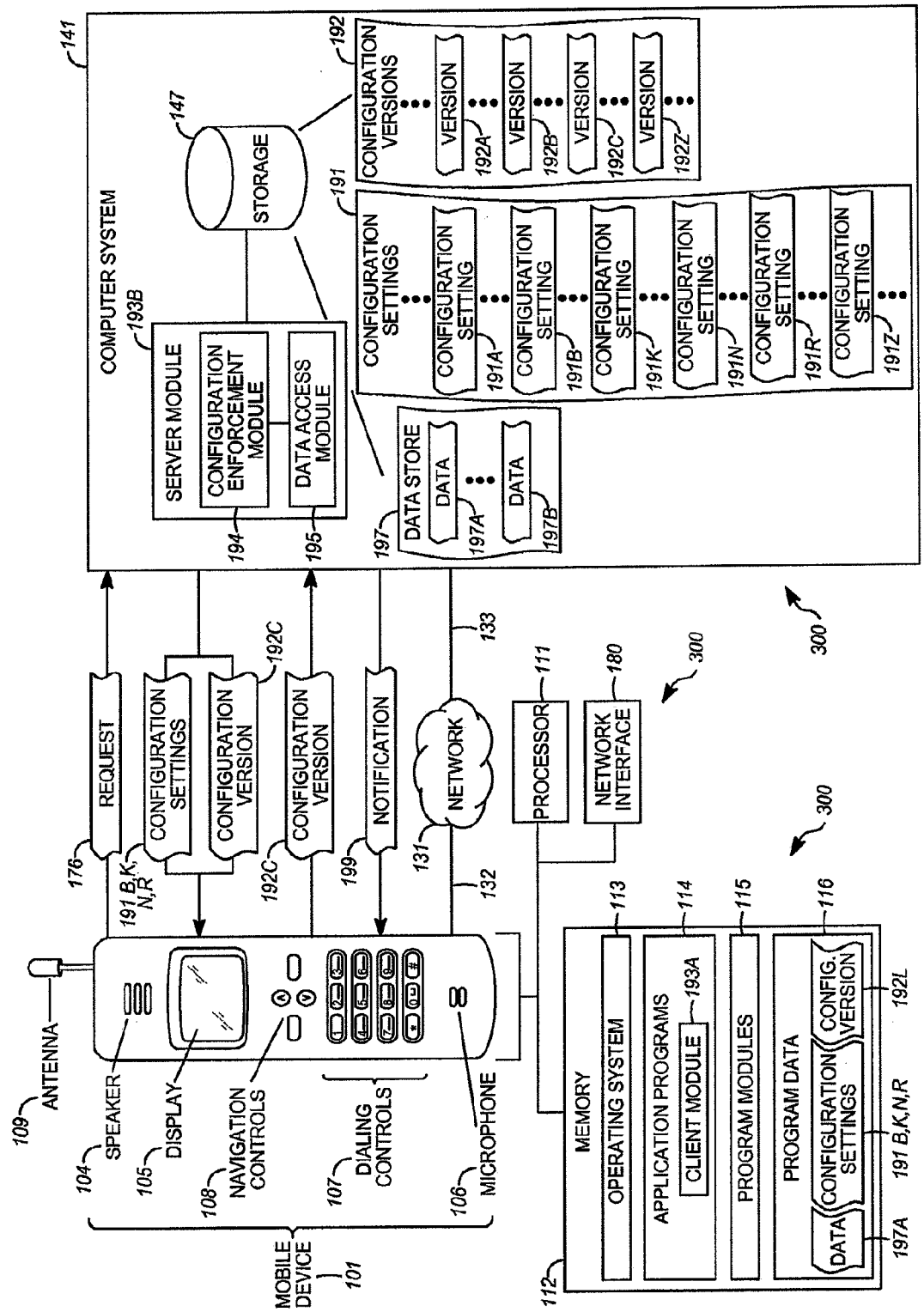
FIG. 3 illustrates an example of an alternate computer architecture that facilitates enforcing configuration settings of mobile devices.

FIG. 3 illustrates an example of an alternate computer architecture 300 that facilitates enforcing configuration settings of mobile devices. As depicted in computer architecture 300, mobile device 101 includes client module 193A (e.g., a Web browser). Mobile device 101 can utilize client module 193A to access data maintained by a server.

Computer system 141 includes server module 193B (e.g., a Web server). Server module 193B further includes policy enforcement module 194 and data access module 195. As depicted, configuration settings 191 includes configuration settings 191 include policy setting 191A, policy setting 191B, and policy setting 191Z. A series of two dots (a vertical ellipsis) between, before and after the expressly depicted configuration settings represents that other configuration settings can be included between, before and after the expressly depicted policy settings. Configuration settings can be name/value pairs. The name represents the name of a configuration setting and the value represents the value of the configuration setting. Configuration setting values can be of virtually any data type, such as, for example, Boolean, integer, floating point, string, character, enumerated, etc. Configuration settings can include: operating system settings, application program settings, hardware settings, allocated resource settings, network interface settings, wireless protocol settings, etc.

It should be understood that embodiments of the present invention are not limited to the expressly described configuration settings. It would be apparent to one skilled in the art, after having reviewed this description, that embodiments of the present in invention can utilize other configuration settings, in addition to those expressly described.

Also as depicted, configuration versions 192 include configuration version 192A, configuration version 192B, and configuration version 192C. A series of two dots (a vertical ellipsis) between, before and after the expressly depicted policy versions represents that other policy versions can be included between, before and after the expressly depicted configuration versions. A configuration version is a reduced set of data, such as, for example, a configuration identifier, that represents a group of one or more configuration settings. For example, configuration version 192C can be used to represent the policy settings 191B, K, N, R. Thus, an indication that a mobile device adheres to configuration version 192C, implies that the mobile device implements configuration settings 191B, K, N, R.

As depicted, data store 197 includes data 197A and 197B. Different data portions can represent different types of data. For example data 197A can be electronic mail messages and data 197B can be Web pages. Alternately, different data portions can represent similar or the same type of data but for entities. For example, data 197A can be Web pages for corporation A and data 197B can be Web pages for corporation B.

Server module 193B can interoperate with client side programs (e.g., client module 193A) to transfer data (e.g., Web pages) to a mobile device. Thus, in response to a mobile device data request, policy enforcement module 194 can determine if a requesting mobile device's policy settings are appropriate for accessing data. For example, policy enforcement module 194 can determine if sufficient resources have allocated at a mobile device to receive a Web page, if a mobile device Web browser includes correct plug-ins for viewing content, if mobile device connection speed will permit a Web page to be downloaded in a reasonable amount of time, etc.

Configuration enforcement module 193 can interoperate with one or more of an authentication module, authorization modules, and policy enforcement module of server module 193B (not shown) to reduce the likelihood of inappropriate data access. When configuration settings are appropriate (and, for example, a user is authenticated and authorized and policy settings are appropriate), data access module 195 accesses requested data and transfers requested data to the requesting mobile device. On the other hand, when configuration settings are inappropriate (and even if a user is authenticated and authorized and policy requirements are appropriate), configuration enforcement module 194 can access appropriate configuration settings and transfer the appropriate configuration settings to the requesting mobile device.

Figure 4:
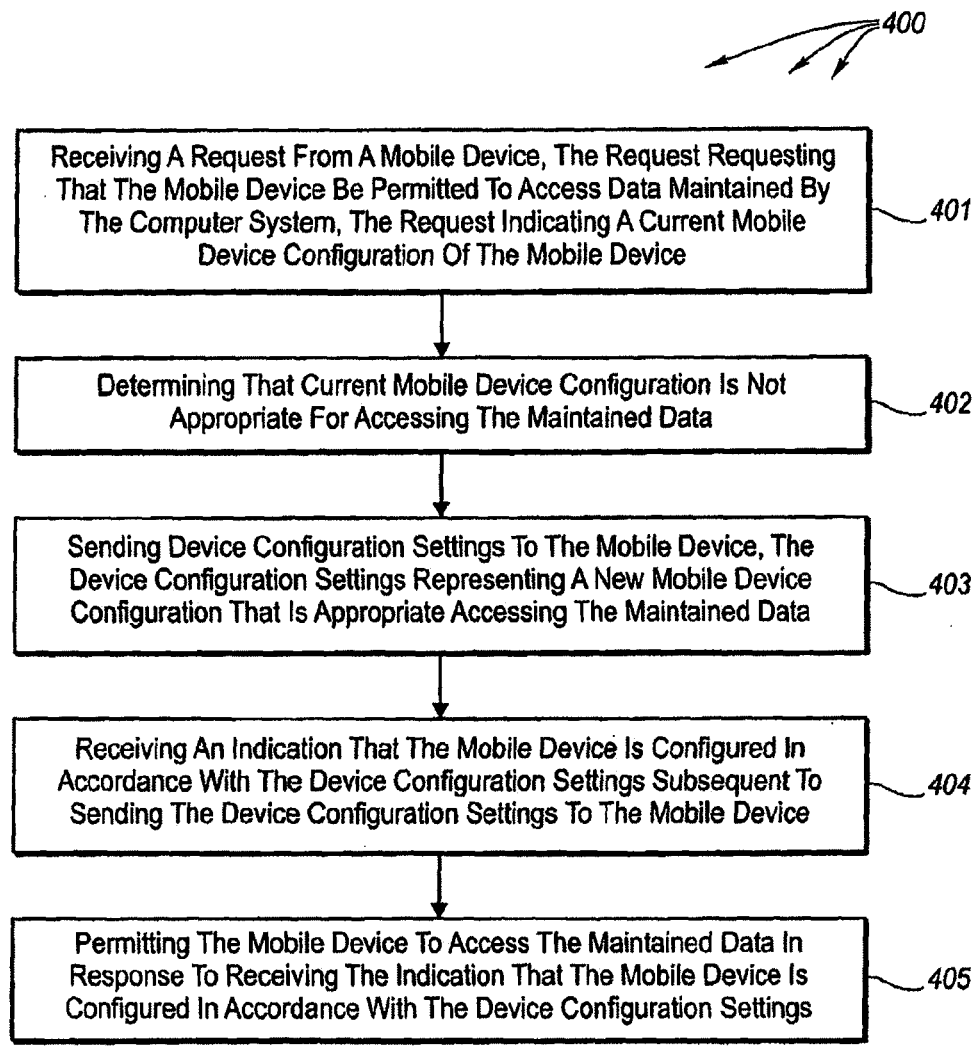
FIG. 4 illustrates an example flow chart of a method for enforcing an appropriate mobile device configuration prior to permitting a mobile device to access maintained data.

FIG. 4 illustrates an example flow chart of a method 400 for enforcing an appropriate mobile device configuration prior to permitting a mobile device to access maintained data. Method 400 will be described with respect to the components and data depicted in computer architecture 300.

Method 400 includes an act of determining that current mobile device configuration is not appropriate for accessing the maintained data (act 401). For example, mobile device 101 (client 193A) can send request 176 to computer system 141. Request 176 can indicate a configuration version representing the one or more of the current configuration settings of mobile device 101. Computer system 141 can receive request 176 from mobile device 101. Request 176 can be a request for data, such, as, for example, a Web page request. Alternately, request 176 can be a provision request expressly requesting appropriate configuration settings.

A request may or may not expressly include a configuration version. Lack of an expressly included configuration version can indicate that a mobile device has yet to implement and/or does not support remote configuration.

Method 400 includes an act of determining that current mobile device configuration is not appropriate for accessing the maintained data (act 402). For example, configuration enforcement module 193 can compare a configuration version included in request 176 to other configuration versions (e.g., included in configuration versions 192) that are appropriate for accessing data (e.g., Web pages in data store 197) maintained by server module 193B (e.g., a Web server). When the included configuration version does not match any other appropriate configuration version, configuration enforcement module 194 determines that the configuration settings of mobile device 101 are inappropriate for accessing data maintained by server module 193B. If no configuration version was included, policy enforcement module 193 can be default determine that the configuration settings of mobile device 101 are inappropriate for accessing data maintained by server module 193B.

In response to detection of an inappropriate configuration, configuration enforcement module 143 can identify configuration settings, such as, for example, 191B, K, N, and R that are appropriate for accessing data maintained by server module 193B. Configuration settings 191B, K, N, and R can correspond to any of the previously described policy settings.

Method 400 includes an act of sending device configuration settings to the mobile device, the device configuration settings representing a new mobile device configuration that is appropriate accessing the maintained data (act 403). For example, server module 193B can send configuration settings 191B, K, N, and R along with configuration version 192L to mobile device 101. Request 176 (a request) and configuration setting 191B, K, N, and R along with configuration version 192L (a response) can be corresponding messages in a request/response protocol, such as, for example, HTTP.

Sent configuration settings can be configuration setting for altering the current configuration of one or more of an operating system, an application program, hardware, allocated resources, a network interface, and wireless protocol settings, at the mobile device.

Mobile device 101 can implement configuration settings 191B, K, N, and R (potentially altering current configuration settings) to comply with configuration settings that are appropriate for accessing data maintained by server module 193B. For example, mobile device 101 can allocate additional memory for client module 193A, verify download speed, and activate an appropriate plug-in in accordance with configuration settings 191B, K, N, and R. Mobile device 101 can store configuration settings 191B, K, N, and R and configuration version 192L in program data 116 for subsequent access.

Implemented configuration settings can alter the current configuration of one or more of an operating system, an application program, hardware, allocated resources, a network interface, and wireless protocol settings, at the mobile device.

Method 400 includes an act of receiving an indication that the mobile device is configured in accordance with the device configuration settings subsequent to sending the device configuration settings to the mobile device (act 404). For example, mobile device 101 can send configuration version 192L to computer system 141. Computer system 141 can receive configuration version 192L from mobile device 101. Configuration enforcement module 143 can determine, for example, through comparison to known appropriate configuration versions, that configuration version 192L represents configuration settings that are appropriate for accessing data 197.

Method 400 includes an act of permitting the mobile device to access the maintained data in response to receiving the indication that the mobile device is configured in accordance with the device configuration settings (act 405). For example, configuration enforcement module 194 can permit mobile device 101 to access data 197A. Server module 193B can subsequently send notification 199 to mobile device 101. Notification 199 can indicate to mobile device 101 that configuration enforcement module 194 has permitted access to data 197A. Data request configuration version 192L (a request) and notification 199 (a response) can be corresponding messages in a request/response protocol, such as, for example, HTTP.

If other access requirements are satisfied (e.g., authentication, authorization, and policy enforcement), mobile device 101 can subsequently access data 197A. Mobile device 101 can then store data 197A for subsequent use by client module 193A, such as, for example, displaying a Web page at display 105.

Accordingly, embodiments of the present invention can be used to reduce the likelihood of a device with inappropriate configuration settings being able to access data. For example, configuration enforcement manager 193B can potentially prevent the download of data to an in appropriate configured mobile device. Preventing the download of data that can not be appropriately processed conserves network bandwidth and systems resources.

Figure 5:
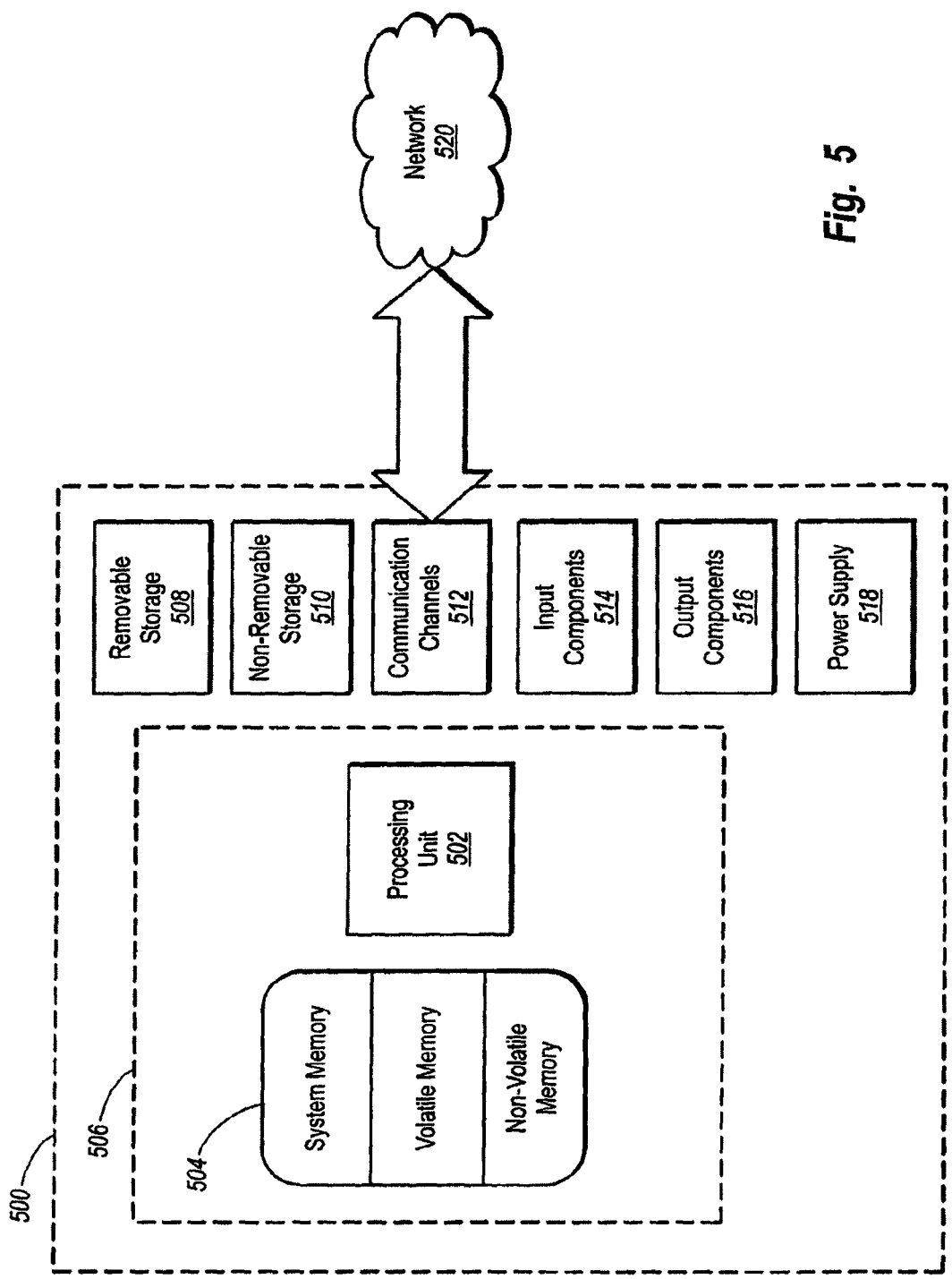
FIG. 5 illustrates a suitable operating environment for the principles of the present invention.

FIG. 5 illustrates a suitable operating environment for the principles of the present invention. FIG. 5 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

FIG. 5 depicts a schematic diagram of a computer system 500. Computer system 141 can include one or more of the components included in computer system 500. For descriptive purposes, the depicted computer system is only one example of a suitable environment and is not intended to suggest any limitation as to the scope of use or functionality of the invention. Neither should the computer systems be interpreted as having any dependency nor requirement relating to any one or combination of components illustrated in FIG. 5.

In some basic configurations, computer system 500 includes at least one processing unit 502 and memory 504. The memory 504 may be volatile (such as RAM), non-volatile (such as ROM, flash memory, etc.), or some combination of the two. One basic configuration is illustrated in FIG. 5 by the dashed line 506.

Included storage media devices may have additional features and functionality. For example, they may include additional storage (removable and non-removable) including, but not limited to, PCMCIA cards, magnetic and optical disks, and magnetic tape. Such additional storage is illustrated in FIG. 5 by removable storage 508 and non-removable storage 510. Computer-storage media include volatile and non-volatile, removable and non-removable media implemented in any method or technology for storage of information such as computer-readable instructions, data structures, program modules, or other data. Memory 504, removable storage 508, and non-removable storage 510 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computer system.

Computer system 500 may also contain communication channels 512 that allow the host to communicate with other systems and devices over a network 520. Communication channels 512 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computer system 500 may also have input components 514 such as a keyboard, mouse, pen, a voice-input component, a touch-input device, and so forth. Output components 516 include screen displays, speakers, printer, etc., and rendering modules (often called "adapters") for driving them. The computer system 500 has a power supply 518. All these components are well known in the art and need not be discussed at length here.

While FIG. 5 represents a suitable operating environment for the present invention, the principles of the present invention may be employed in any system that is capable of, with suitable modification if necessary, implementing the principles of the present invention. The environment illustrated in FIG. 5 is illustrative only and by no means represents even a small portion of the wide variety of environments in which the principles of the present invention may be implemented.

In accordance with the present invention, modules including policy enforcement modules, client modules, server modules, and data access modules, as well as associated data, including data commands, data requests, notifications, policy requests, policy settings, policy versions, configuration settings, and configuration versions can be stored and accessed from any of the computer-readable media associated with computer system 500. When a mass storage device, such as, for example, non-removable storage 510, is coupled to computer system 500, such modules and associated program data may also be stored in the mass storage device. In a networked environment, program modules depicted relative to computer system 500, or portions thereof, can be stored in remote memory storage devices, such as, system memory and/or mass storage devices associated with remote computer systems. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. A system comprising:
    at least one processor; and
    memory encoding computer executable instructions that, when executed by the at least one processor, perform a method for enforcing an appropriate mobile device configuration prior to permitting a mobile device to access the maintained data, the method comprising:
        receiving a request from a mobile device, the request requesting that the mobile device be permitted to access data maintained by the computer system, the request indicating a current mobile device configuration settings of the mobile device;
        determining that the current mobile device configuration settings are not appropriate for accessing the maintained data;
        based upon the determination, sending a notification indicating that the current device configuration settings are not acceptable for accessing the maintained data;
        receiving a policy request to the computer system, the policy request requesting policy settings that are appropriate for accessing the maintained data;
        in response to receiving the policy request, sending device configuration settings to the mobile device, the device configuration settings representing a new mobile device configuration that is appropriate accessing the maintained data;
        receiving an indication that the mobile device is configured in accordance with the device configuration settings subsequent to sending the device configuration settings to the mobile device; and
        permitting the mobile device to access the maintained data in response to receiving the indication that the mobile device is configured in accordance with the device configuration settings.

2. The system as recited in claim 1, wherein receiving a request from a mobile device comprises receiving a request that was sent in accordance with HTTP.

3. The system as recited in claim 1, wherein receiving a request from a mobile device comprises receiving a request for a Web page.

4. The system as recited in claim 1, wherein receiving a request from a mobile device comprises receiving a request from a mobile device selected from among a mobile telephone, a PDA, and a watch.

5. The system as recited in claim 1, wherein determining that current mobile device configuration is not appropriate for accessing the maintained data comprises comparing a received configuration version to one or more configuration versions representing appropriate configurations for accessing the maintained data.

6. The system as recited in claim 1, wherein sending device configuration settings to the mobile device comprises sending configuration settings that are designated to alter the current configuration of one or more of an operating system, an application program, hardware, allocated resources, a network interface, and wireless protocol settings, at the mobile device.

7. The system as recited in claim 1, further comprises:
    notifying the mobile device that access to maintained data has been permitted.

8. The system as recited in claim 7, wherein receiving an indication that the mobile device is configured in accordance with the device configuration settings comprises comparing a received configuration version to one or more configuration versions representing appropriate configurations for accessing the maintained data.

9. A system comprising:

at least one processor; and memory encoding computer executable instructions that, when executed by the at least one processor, perform a method for enforcing mobile device access policies prior to permitting mobile device access to maintained data, the method comprising:

receiving a data command from a mobile device, the data command indicating a policy version, the policy version representing the current policy settings at the mobile device;

determining that the current policy settings at the mobile device are not appropriate for accessing data maintained by the computer system;

notifying the mobile device that the current policy settings are not appropriate for accessing the maintained data;

receiving a policy request from the mobile device, the policy request requesting policy settings that are appropriate for accessing the maintained data;

in response to receiving the policy request, identifying updated policy settings that are appropriate for accessing the maintained data;

sending the updated policy settings along with a corresponding updated policy version to the mobile device, the updated policy version representing the updated policy settings;

receiving a data request along with the updated policy version from the mobile device, the data request requesting that the mobile device be permitted to access the maintained data, the updated policy version indicating that the mobile device is configured in accordance with the updated policy settings; and permitting the mobile device that access to the maintained data has been permitted.

10. The method as recited in claim 9, wherein receiving a data command from a mobile device comprises receiving a request for electronic mail data.

11. The method as recited in claim 9, wherein determining that the current policy settings at the mobile device are not appropriate for accessing data maintained by the computer system comprises comparing a received policy version, representing the current policy settings to one or more policy versions representing appropriate policy settings for accessing the maintained data.

12. The method as recited in claim 9, wherein determining that the current policy settings at the mobile device are not appropriate for accessing data maintained by the computer system comprises determining that the mobile device does not support policy settings.

13. The method as recited in claim 9, wherein determining that the current policy settings at the mobile device are not appropriate for accessing data maintained by the computer system comprises determining that the mobile device does not support PIN lock.

14. The method as recited in claim 9, wherein receiving a policy request from the mobile device comprises receiving a policy request for policy settings that are appropriate for accessing electronic mail data.

15. The method as recited in claim 9, wherein receiving a policy request from the mobile device comprises receiving a policy request from a mobile device selected from among a mobile telephone, a PDA, and a watch.

16. The method as recited in claim 9, wherein identifying updated policy settings that are appropriate for accessing the maintained data comprises identifying one or more of PIN lock settings, storage wipe settings, periodic enforcement settings, and policy exceptions.

17. The method as recited in claim 9, wherein sending the updated policy settings along with a corresponding updated policy version to the mobile device comprises sending or more of PIN lock settings, storage wipe settings, periodic enforcement settings, and policy exceptions.

18. The method as recited in claim 9, where receiving a data request along with the updated policy version from the mobile device comprises receiving a policy version indicating that the user of the mobile device is at least temporarily excepted from policy compliance.

19. The method as recited in claim 9, further comprising:

initiating a remote storage wipe of the mobile device.

20. A computer storage media having stored thereon computer-executable instructions that, when executed by a processor, cause the computer system to perform a method comprising:

receive a data command from a mobile device, the data command indicating a policy version, the policy version representing the current policy settings at the mobile device;

determine that the current policy settings at the mobile device are not appropriate for accessing data maintained by the computer system;

notify the mobile device that the current policy settings are not appropriate for accessing the maintained data;

receive a policy request from the mobile device, the policy request requesting policy settings that are appropriate for accessing the maintained data;

in response to receiving the policy request, identify updated policy settings that are appropriate for accessing the maintained data;

send the updated policy settings along with a corresponding updated policy version to the mobile device, the updated policy version representing the updated policy settings;

receive a data request along with the updated policy version from the mobile device, the data request requesting that the mobile device be permitted to access the maintained data, the updated policy version indicating that the mobile device is configured in accordance with the updated policy settings; and notify the mobile device that access to the maintained data has been permitted.

* * * * *